United States Patent [19]
Lee et al.

[11] Patent Number: 4,720,668
[45] Date of Patent: Jan. 19, 1988

[54] ZERO-VOLTAGE SWITCHING QUASI-RESONANT CONVERTERS

[76] Inventors: Fred C. Lee, 1405 Westover Dr., Blacksburg; Kwang-Hwa Liu, P.O. Box E-3, Drapers Meadow, Blacksburg, both of Va. 24060

[21] Appl. No.: 877,185

[22] Filed: Jun. 20, 1986

[51] Int. Cl.$^4$ .............................................. G05F 1/40
[52] U.S. Cl. .................................... 323/271; 323/235
[58] Field of Search ............... 323/222, 235, 271, 272, 323/282–287, 319; 363/18

[56] References Cited

U.S. PATENT DOCUMENTS

| | | | |
|---|---|---|---|
| 4,016,461 | 4/1977 | Roland | 323/282 X |
| 4,168,477 | 9/1979 | Burchall | 323/222 |
| 4,323,845 | 4/1982 | Leach | 323/272 X |
| 4,417,197 | 11/1983 | Schwarz | 323/272 |
| 4,546,421 | 10/1985 | Bello et al. | 363/21 |
| 4,585,986 | 4/1986 | Dyer | 323/271 |
| 4,592,763 | 6/1986 | Dietz et al. | 323/271 X |
| 4,620,271 | 10/1986 | Musil | 323/222 X |

FOREIGN PATENT DOCUMENTS

530402  6/1976  U.S.S.R. ............................. 323/271

*Primary Examiner*—Peter S. Wong
*Assistant Examiner*—Marc S. Hoff
*Attorney, Agent, or Firm*—Mason, Fenwick & Lawrence

[57] ABSTRACT

A quasi-resonant converter is disclosed as comprising a power source, a load and a resonant switch circuit for periodically connecting the power source to the load. The resonant switch circuit includes a switch for connecting the power source to the load and for disconnecting the power source from the load, and a resonant circuit comprised of a resonant capacitor and a resonant inductor. The switch is operated at a switching frequency in excess of 1 MHz and in the order of 10 to 20 MHz or greater. The resonant circuit is connected to the switch to impose thereon a voltage waveform as developed across the resonant capacitor. The resonant capacitor and the resonant inductor have respective impedances selected to shape the voltage waveform such that a zero-voltage condition is imposed upon the switch when it is disposed to its on state, whereby the parasitic capacitive losses associated with the switch are eliminated.

41 Claims, 111 Drawing Figures

ZERO-VOLTAGE SWITCHING QUASI-RESONANT CONVERTERS

BACKGROUND OF THE INVENTION

1. Field of the Invention

This invention relates to switching converters particularly adapted to switch at relatively high frequencies and, in particular, to such converters that achieves switching on and off under zero-voltage conditions, whereby switching losses associated with semiconductor switching devices may be substantially eliminated.

2. Cross-Reference To Copending Applications

Attention is drawn to the following copending, commonly assigned applications, all/each incorporated specifically by reference into the instant specification:

(1) "RESONANT CONVERTERS WITH SECONDARY-SIDE RESONANCE", filed Apr. 28, 1986 in the names of Fred C. Lee and Kwang-Hwa Liu, Ser. No. 856,775; and (2) "ZERO-CURRENT SWITCHING CONVERTERS", filed on even date in the names of Fred C. Lee and Kwang-Haw Liu, Ser. No. 877,184 filed June 20, 1986.

3. Description of the Prior Art

Electronic power processing technology has evolved around two fundamentally different circuit schemes: (1) duty-cycle modulation, commonly known as Pulse Width Modulation (PWM), and resonance. The PWM technique processes power by interrupting the power flow and controlling the duty cycle, thus, resulting in pulsating current and voltage waveforms. The resonant technique processes power in a sinusoidal form. Due to circuit simplicity and ease of control, the PWM technique has been used predominantly in today's power electronics industries, particularly, in low-power power supply applications, and is quickly becoming a mature technology. Resonant technology, although well established in high-power SCR motor drives and uninterrupted power supplies, has not been widely used in low-power dc/dc converter applications due to its circuit complexity.

In conventional PWM converters, a switching device typically in the form of an available semiconductor switch turns on and off repetitively at a rate typically in the range of 30–50 kHz and at high current levels to achieve power conversion and output voltage regulation. Such converters employ magnetic and capacitive components for energy storage/transfer and ripple filtering. With the advent of the power MOSFETs, switching speed may be increased as high as tens of MHz. Operating such magnetic and capacitive components at high frequencies reduces their size and cost. In typical PWM switching converters, the impedance of such reactive components is coupled in circuit with the semiconductor switches. As the switching frequency is increased, such reactive components adversely affects these switches. As the switch is turned on and off rapidly, switching transients involving high levels of current and voltage occur, whereby high switching stresses and losses are imposed upon the semiconductor switch. When such a switch is switched or "forced off", the energy still present in the coupled inductive element imposes high current and high voltage and, thus, high switching stress and loss on the switch. Furthermore, the pulsating current waveforms resulting from rapid switching, cause severe electromagnetic interation (EMI) problems as the switching frequency is increased. Nonetheless, it is desired to switch such semiconductor switches at higher switching frequencies to improve the dynamic and response time of the voltage control and regulation and, at the same time, minimize the size and cost of the inductive and capacitive elements employed in such converters. However, as the switching frequency increases, the above-noted switching stresses and losses increase and the converter's overall efficiency and reliability decrease.

To reduce switching stress and loss, the technique of "zero-current switching" has been described in "Resonant Switching Power Conversion Technique," by E. E. Buchanan and E. J. Miller, IEEE Power Electronics Specialists Conference, 1975 Record, pp. 188–193 and in "Resonant Switching Power Conversions," by E. J. Miller, IEEE Power Electronics Specialists Conferences, 1976 Record, pp. 206–211. Such "zero-current switching" technique utilizes an LC resonant tank circuit to force the current through the semiconductor switch to oscillate, whereby the semiconductor switch turns off at zero current level, thereby drastically reducing switching stresses and losses.

To generalize the zero-current switching technique, the concept of a resonant switch was described in "Resonant Switches—A Unified Approach to Improve Performance of Switching Converters," by the inventors of this invention, IEEE International Telecommunications Energy Conference, 1984 Proceedings, pp. 344–351. This paper described the use of "resonant switches" in various conventional pulse-width modulated switching converters to achieve "zero-current switching". Generally, such resonant switches are a subcircuit comprising a semiconductor switch $S_1$, a resonance inductor $L_r$, and a resonance capacitor $C_r$. There are two types of resonant switch configurations as shown respectively in FIGS. 1A and 1B, an L-type and an M-type resonant switch. In both cases, the inductor $L_r$ is connected in series with the switch $S_1$ to slow down the current change rate, and the capacitor $C_r$ is added as an auxiliary energy storage/transfer element. If switch $S_1$ is a device without reverse voltage blocking capability or contains an internal anti-parallel diode, an additional diode $D_1$ is needed and should be connected in series with the switch $S_1$ and the inductor $L_r$. The inductor $L_r$ and the capacitor $C_r$ together constitute a series resonant circuit with respect to the switch $S_1$. When the switch $S_1$ conducts, current flows through switch $S_1$ and inductor $L_r$ into the capacitor $C_r$ with a quasi-sinusoidal waveform. As the inductor current drops to zero, the capacitor voltage $V_c$ is charged up with a negative polarity with respect to switch $S_1$, thus commutating off the switch $S_1$. The resonant switch therefore, provides zero-current switching properties during both turn on and turn off.

Figure 1A:
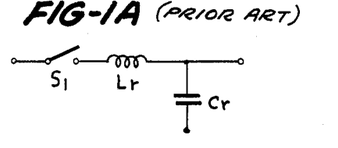
FIG. 1A and FIG. 1B are respectively an L-type and an M-type resonant switch, as known, in the prior art.
Figure 2A:
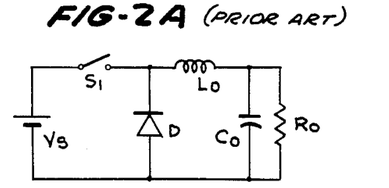
FIGS. 2A, 2B, 2C, 2D and 2E are respectively a conventional buck converter, a quasi-resonant buck converter incorporating the L-type quasi-resonant switch shown in 1A, and a quasi-resonant buck converter incorporating the M-type resonant type switch as shown in FIG. 1B, and a resistive-load switching circuit illustrating the voltage states respectively when $V_{G1}$ and $-V_{G2}$ voltages are applied to the gate of the MOSFET Q and O and $V_D$ voltages are applied to the drain of the MOSFET Q, all known in the prior art.
Figure 2B:
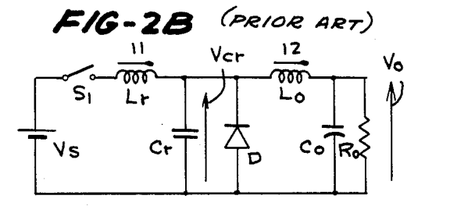

A conventional buck converter is illustrated in FIG. 2A, as comprising a switch $S_1$ for applying upon being rendered conductive, a voltage source $V_s$ across a free-wheeling diode D. The free-wheeling diode D is coupled to a filter circuit comprised of an output inductor $L_o$ disposed in circuit with an output capacitor $C_o$ which is connected in parallel with an output resistor $R_o$. This conventional buck converter is modified as shown in FIG. 2B by the addition of the L-type resonant switch, as first shown in FIG. 1A, between voltage source $V_s$ and the free-wheeling diode D. The output inductance $L_o$ is selected to be much larger than inductance $L_r$, thus making the resonant frequency of the filter circuit comprised of capacitor $C_o$ and the inductor $L_o$ much smaller than that of the resonant circuit comprised of the capacitor of $C_r$ and the resonant inductor $L_r$. It is also assumed that inductor $L_o$ is sufficiently large so that the current $I_2$ through the inductor $L_o$, remains relatively constant throughout a switching cycle.

Figures 3A, 3B, 3C, 3D:
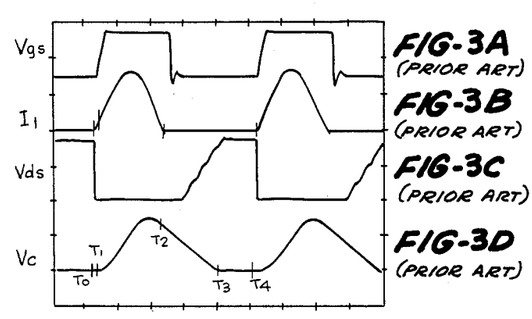
FIGS. 3A, 3B, 3C and 3D are respectively waveforms occurring in the course of the operation of the buck quasi-resonant converter as shown in FIG. 2B.

The operation of the buck quasi-resonant converter employing the L-type resonant switch as shown in FIG. 2B, will now be explained with reference to the waveforms as shown in FIGS. 3A to 3D. Before time $T_0$, the semiconductor switch $S_1$ is turned off, whereby the free-wheeling diode D carries the output current $I_o$ with the capacitor voltage $V_c$ clamped at zero. In the first of four distinct stages, the semiconductor switch $S_1$ is turned on at time $T_0$, whereby the input current $I_1$ flowing through the semiconductor switch $S_1$ and the resonant inductor $L_r$ rises linearly as shown in the waveform of FIG. 3B between times $T_0$ and $T_1$. Between times $T_0$ and $T_1$, the output current $I_2$ shifts gradually from the path through the free-wheeling diode D to the path through the semiconductor switch $S_1$ and the resonant inductor $L_r$.

At time $T_1$, the current $I_1$ becomes equal to current $I_2$, whereby the free-wheeling diode D is turned off and, as seen in FIG. 3B, the current $I_1$ begins to charge capacitor $C_r$. As seen in FIG. 3B, the flow of the current of $I_1$ through the resonant inductor $L_r$ and the voltage $V_c$ appearing on resonant capacitor $C_r$ is substantially sinusoidal rising to a peak and falling back to zero at time $T_2$. As shown in FIG. 3D, the voltage $V_c$ rises to a peak of approximately $2V_s$ shortly before time $T_2$, whereby a reverse voltage of $V_c-V_s$ is applied to the semiconductor switch $S_1$ commutating it off naturally at time $T_2$. As shown in FIG. 3B, zero current is flowing in the semiconductor switch $S_1$ at time $T_2$, when it is commutated off. As shown in FIG. 3D, the capacitor $C_r$ discharges in the time interval from time $T_2$ to time $T_3$. The capacitor voltage $V_c$ drops linearly to zero at time $T_3$. In the fourth stage from time $T_3$ to time $T_4$, the output current $I_2$ flows through the free-wheeling diode D and, with the switch $S_1$ open, the resonant capacitor $C_r$ is clamped to zero voltage. At time $T_4$, the switch $S_1$ turns on again, starting the next switching cycle.

Figure 1B:
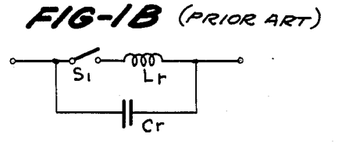
Figure 2C:
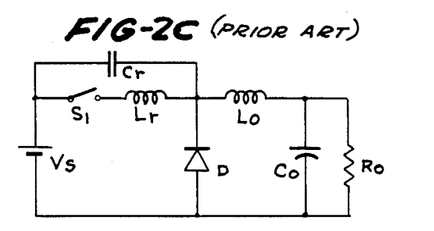

FIG. 2C shows a buck quasi-resonant converter circuit in which the resonant capacitor $C_r$ is coupled in parallel between the voltage source $V_s$ and the resonant inductor $L_r$ instead of in parallel with the free-wheeling diode D, whereby an M-type resonant switch, as shown first in FIG. 1B, is formed. The modified buck quasi-resonant converter of FIG. 2C operates in four stages in a manner similar to the operation of the buck quasi-resonant converter as described above with respect to FIG. 2B.

As shown in FIGS. 2B and 2C, such zero-current quasi-resonant converters utilize the principal of inductive or capacitive energy storage and transfer in a similar fashion as PWM converters. Further, the zero-current quasi-resonant converters of FIGS. 2B and 2C employ an LC tank circuit comprised of the resonant inductor $L_r$ and the resonant capacitor $C_r$. The LC tank circuit is coupled close to the power switch $S_1$ and is used not only to shape the current and voltage waveforms of the switch $S_1$, but also serves as an intermediate energy tank that stores and transfers energy from the voltage source $V_s$ to the output LC tank circuit. The switch $S_1$ takes the form of such power processing semiconductor switching devices as bipolar transistors and MOSFETs. The conduction loss of bipolar transistor and MOSFETs remains relatively constant at high switching frequencies, while the switching losses often increase in direct proportion to the switching frequency.

The switching losses can be categorized in the following two forms: (1) the turn off loss and (2) the turn on loss. A minority-carrier device such as a bipolar transistor has a relatively longer turn off storage time and (current) fall time. For PWM converters, the voltage $V_{ce}$ across the transistor's output terminals at turn off, increases rapidly to a high level before the current $I_c$ starts to drop. The simultaneous presence of high voltage and high current levels causes a certain amount of energy to be dissipated within such devices. In contrast with a bipolar transistor, a majority carrier device such as a can switch at much higher switching frequencies with no storage time and much shorter fall time, whereby there is a relatively small turn off loss.

Switching devices of conventional PWM DC-to-DC converters, as well as the semiconductor switches $S_1$ as employed in the quasi-resonant converters of FIGS. 2B and 2C, turn on at relatively high voltage levels. As seen in FIG. 3C, the voltage $V_{ds}$ imposed upon the switch $S_1$ at turn on time $T_0$, is relatively high. Since bipolar transistors and MOSFETs have respectively intrinsic parasitic capacitances $C_{ce}$ and $C_{ds}$ at their output terminals, turn on at high voltage levels induces a turn on loss of $\frac{1}{2} CV^2 F_s$, where C is the value of the parasitic drain-to-source or the collector-to-emitter capacitance, V is the voltage across the output terminals of the switch $S_1$ before turn on, and $F_s$ is the switching frequency. This turn on loss becomes significant as the switching frequency is increased. As shown in FIGS. 2B and 2C, the switching device $S_1$ is associated with the resonant inductor $L_r$ and the resonant capacitor $C_r$, which serve to store and transfer energy. However, when the switch $S_1$ is turned on at a high voltage level, this energy is stored or trapped within the parasitic capacitance of the switch $S_1$, resulting in the aforeascribed turn on loss. Thus, it is seen that the zero-current quasi-resonant converters as shown in FIGS. 2B and 2C cannot alleviate the problem of high switching losses associated with the inherent, parasitic capacitance of such power switches as bipolar transistors and MOSFETs.

Figures 2D, 2E, 4A, 4B, 4C, 4D, 4E, 4F, 4G:
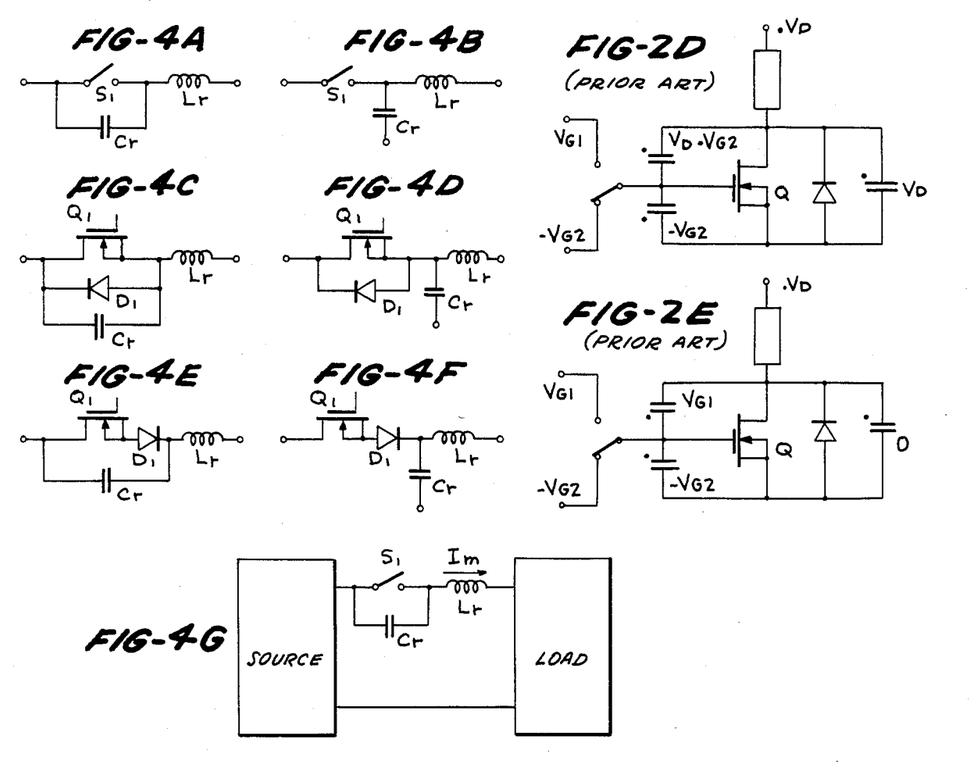
FIGS. 4A and 4B show respectively two embodiments of voltage-mode resonant subcircuits as employed within the zero-voltage switching resonant converter of this invention.
FIGS. 4C and 4D show respectively the switches of the half-mode voltage-mode resonant switch subcircuits of FIGS. 4A and 4B implemented by a transistor and an anti-parallel diode coupled in parallel with each other.
FIGS. 4E and 4F show the switches of the full-wave voltage-mode resonant switch subcircuits of FIGS. 4A and 4B implemented by a transistor coupled in parallel with a diode.
FIG. 4G shows in general form the voltage-mode resonant subcircuit of FIG. 4A in a DC-to-DC converter.

A MOSFET has an insulated gate structure, which results in relatively high gate-to-drain capacitance $C_{GD}$ and gate-to-source capacitance $C_{GS}$. Along with the junction depletion-capacitance $C_{DS}$, these capacitances play important roles in the switching behavior of MOSFETs. In a typical resistive-load switching circuit as shown in FIGS. 2D and 2E, the gate voltage is switched between $V_{G1}$ and $V_{G2}$ and the drain voltage is switched between 0 and $V_D$. Before the turn on of the MOSFET Q as shown in FIG. 2D, the voltage states on capacitances $C_{GD}$, $C_{GS}$ and $C_{DS}$ are $(V_D+V_{G2})$, $-V_{G2}$ and $V_D$, respectively. After the MOSFET Q is completely turned on by the gate drive, the voltage states of the capacitances become respectively $-V_{G1}$, $V_{G1}$ and 0, as shown in FIG. 2E. The voltage changes are $-(V_D+V_{G1}+V_{G2})$, $(V_{G1}+V_{G2})$, and $-V_D$. For the gate drive circuit, it must supply charging currents to capacitance $C_{GD}$ as well as to capacitance $C_{GS}$, as the voltages across these devices change abruptly. This phenomenon of displacement current due to high dv/dt across the gate capacitance $C_{GD}$ is similar to the Miller effect occurring in amplifier circuits, although in this case it is of a large-signal nature. More specifically, the Miller effect transfers the rate of change of the voltage $V_{DS}$ across the output of the MOSFET Q to its gate through the capacitance $C_{GD}$, whereby if the MOSFET Q turns on when a voltage is applied to its output, a resulting ringing voltage will be induced to its gate. Potentially, the ringing voltage applied to the MOSFET's gate may render the normal operation of the MOSFET impossible.

SUMMARY OF THE INVENTION

It is an object of this invention to provide a family of new and improved quasi-resonant converters, named zero-voltage switching quasi-resonant converters, which eliminate parasitic capacitive losses at switch turn on, and also eliminate switching dv/dt noise, known as the Miller Effect.

It is a more particular object of this invention to provide a family of new and improved quasi-resonant converters employing switches, which are turned on and turned off under zero voltage conditions.

It is a still further object of this invention to provide a family of new and improved quasi-resonant converters employing switches, which are turned on and off at switching frequencies in excess of 1 MHz and typically in the order of 10 or 20 MHz or greater.

In accordance with these and other objects of the invention, there is provided a quasi-resonant converter comprising a current source, a load and a zero-voltage resonant switch circuit for periodically connecting the current source to the load. The resonant switch circuit includes a switch operable in its on state for connecting the current source to the load and in its off state for disconnecting the current source from the load, and a resonant circuit comprised of a resonant capacitor and a resonant inductor. The resonant circuit is connected to the switch to impose thereon a voltage waveform as developed across the resonant capacitor. The resonant capacitor and the resonant inductor have respective impedances selected to shape the voltage waveform such that a zero-voltage condition is imposed upon the switch, when it is disposed to its on state, whereby the parasitic capacitive losses associated with the switch, e.g. a semiconductor switch, are eliminated.

In a further aspect of this invention, the switch is periodically disposed to its on and off states at a selected switching frequency, and the impedances of the resonant capacitor and resonant inductor are selected such that the resonant frequency it greater than the switching frequency to insure that the voltage waveform imposed across the switch by the resonant capacitor is at substantially zero volts, when the switch is next disposed to its on state.

In a further aspect of this invention, a switch or switch subcircuit is incorporated within the quasi-resonant converter to effect converter operation in a full-wave mode. The switch is disposable to its on state to permit a current flow in a first direction from the voltage source to the load and to block the current flow in a second, opposite direction, and disposable to its off state to block the current flow in the first direction. In an illustrative embodiment of the invention, the switch comprises a semiconductor switch, either a bipolar transistor or a FET, and a diode coupled in series with the semiconductor switch.

In a still further aspect of this invention, a switch or switch subcircuit as comprised of a transistor and a diode coupled in parallel with each other is incorporated with a quasi-resonant converter to effect converter operation in a half-wave mode. In particular, the transistor, diode and resonant capacitor are coupled in parallel with each other to form a parallel circuit, which is in turn connected in series with the resonant inductor. The transistor is rendered conductive to permit a current flow in a first direction from the current source to the load, while the diode is rendered conductive to permit a current flow in a second, opposite direction. The switch may illustratively take the form of a bipolar transistor or a FET.

BRIEF DESCRIPTION OF THE DRAWINGS

A detailed description of a preferred embodiment of this invention is hereafter made with specific reference being made to the drawings, in which.

DETAILED DESCRIPTION OF A PREFERRED EMBODIMENT

Referring initially to FIGS. 4A and 4B, there is shown a subcircuit of a zero-voltage switching quasi-resonant converter of this invention, as comprising a semiconductor switch $S_1$, a resonant inductor $L_r$ and a resonant capacitor $C_r$. In accordance with the teachings of this invention, switch losses as occurring within the parasitic capacitance of the switch $S_1$ are substantially eliminated by shaping the voltage waveform occurring across the output of the switch $S_1$ in a manner that the voltage $V_{ds}$ as appears across the drain to source of the transistor $Q_1$ in the form of a MOSFET, is zero at the instant the switch $S_1$ turns on. The resonant capacitor $C_r$ may take the form of the parasitic capacitance of the semiconductor switch $Q_1$ or an external capacitor or both. The resonant capacitor $C_r$ is connected in series to the resonant conductor $L_r$.

The configuration of the resonant semiconductor switch $S_1$ determines its operation mode. If the switch $S_1$ is implemented by a transistor $Q_1$ and an anti-parallel diode $D_1$, as shown in either of FIGS. 4C and 4D, the voltage $V_c$ across the capacitor $C_r$ is clamped by the diode $D_1$ to a minimum value (approximately zero volt), and the resultant resonant switch operates in a half-wave mode. If the semiconductor switch $S_1$ is implemented by a transistor $Q_1$ connected in series with a diode $D_1$, as shown in FIGS. 4E and 4F, the voltage $V_c$ can oscillate freely and the quasi-resonant converter including such a switch operates in a full-wave mode. As will become evident, the resonant interaction of the tank circuit comprising the resonant inductor $L_r$ and the resonant capacitor $C_r$ is initiated by the opening or turning off of the switch $S_1$.

The subcircuit as shown in any of FIGS. 4A, 4B, 4C, 4D, 4E and 4F may be incorporated in a family of DC-to-DC resonant converters to achieve the zero-voltage operation in accordance with this invention. In FIG. 4G, the resonant switch subcircuit of FIG. 4A is incorporated in general form between a source and a load. As can be seen, one end of switch $S_1$, inductor $L_r$ and capacitor $C_r$ are connected at a common node or connection point N. The capacitor $C_r$ serves as a turn off snubber element, and the resonant conductor $L_r$ facilitates resonant action along with the resonant capacitor $C_r$ at turn off to shape the voltage waveform appearing across the switch $S_1$. During the on period, the current through switch $S_1$ establishes a constant current level $I_m$. When the switch $S_1$ is turned off, the current $I_m$ is diverted from flowing through the switch $S_1$ to flowing through the resonant capacitor $C_r$. The voltage $V_c$ across capacitor $C_r$ rises in a sinusoidal fashion due to the resonant interaction with the inductor $L_r$. After a timed interval determined primarily by the resonant circuit formed by the resonant capacitor $C_r$ and the resonant $L_r$, the capacitor voltage $V_c$ returns to negative, allowing the switch $S_1$ to turn on under zero-voltage condition. Since the switch $S_1$ turns on under zero-voltage condition and all energy temporarily stored in the parasitic capacitance is recycled and not trapped within the switch $S_1$, the turn on loss is eliminated.

Figure 5A:
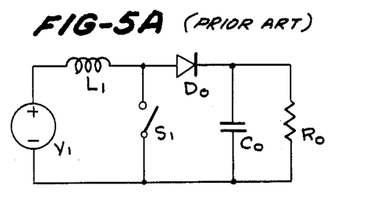
FIGS. 5A, 5B, 5C and 5D are respectively the basic circuit arrangement of a boost converter as known in the prior art, the steady-state equivalent circuit of the boost converter as shown in FIG. 5A, a generalized expression of a boost quasi-resonant converter circuit employing a voltage-mode resonant switch subcircuit as shown in FIG. 4A in accordance with the teachings of this invention, and a detailed, illustrative circuit of a boost quasi-resonant converter including the half-wave voltage-mode resonant switch subcircuit in accordance with the teachings of this invention.
Figure 5B:
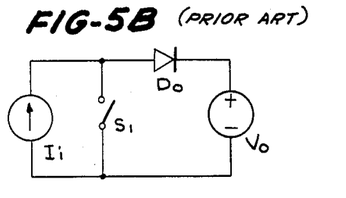
Figure 5C:
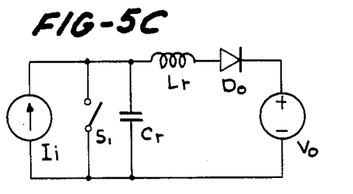

As will now be illustrated with respect to FIGS. 5A, 5B, 5C and 5D, the voltage-mode resonant switch subcircuits as shown in FIGS. 4A through 4F may be incorporated into a family of DC-to-DC converters. A conventional boost converter, as shown in FIG. 5A, comprises an input or source voltage $V_i$, which is connected in series with an inductor $L_1$. If the impedance of the inductor $L_1$ is large enough, the input voltage source $V_i$ may be treated as a constant current source supplying a constant current $I_i$ to a rectifying circuit comprised of diode $D_o$ and a capacitor $C_o$, which supplies voltage to a load indicated by a resistor $R_o$. If the capacitor $C_o$ is large enough, the load may be represented as a constant voltage load $V_o$. FIG. 5B illustrates the steady-state equivalent circuit of the boost converter of FIG. 5A, including the constant current source $I_i$ and the constant voltage load $V_o$ as interconnected by the switch $S_1$ and the diode $D_o$. Power is supplied to the constant voltage load $V_o$ by turning on and off the switch $S_1$ at a selected duty-cycle. FIG. 5C illustrates a voltage-mode quasi-resonant boost converter in accordance with the teachings of this invention and including a resonant switch subcircuit comprised of the switch $S_1$, the resonant capacity $C_r$ coupled in parallel therewith and the resonant inductor $L_r$ connected in series with the switch $S_1$. The operation of the voltage-mode quasi-resonant boost converter of FIG. 5C is largely determined by the impedance values of the inductor $L_r$ and the capacitor $C_r$, which in turn defines the following parameters:

$$\text{characteristic impedance } Z_n = \sqrt{\frac{L_r}{C_r}} \quad (1)$$

$$\text{resonant angular frequency } \omega = \frac{1}{\sqrt{L_r C_r}} \quad (2)$$

$$\text{resonant frequency } F_n = \frac{\omega}{2\pi} \quad (3)$$

$$\text{normalized load resistance } r = \frac{R_o}{Z_n} \quad (4)$$

Figure 5D:
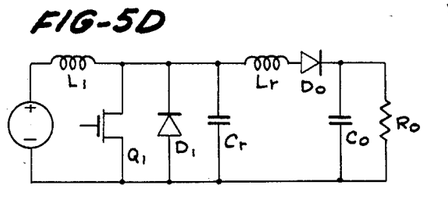
Figure 6A:
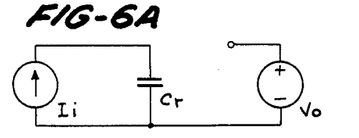
FIGS. 6A, 6B, 6C and 6D show respectively the equivalent circuits of the voltage-mode quasi-resonant boost converter as shown in FIG. 5C in its four switching stages.
Figure 7A:
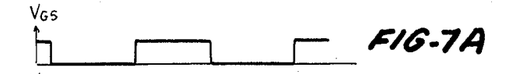
FIGS. 7A, 7B, 7C, 7D and 7E show circuit waveforms of the voltage-mode quasi-resonant boost converter as shown in FIG. 5C and incorporating the resonant switch subcircuit with its anti-parallel diode as shown in FIG. 4C as operating in its half-wave, mode.
Figure 7B:
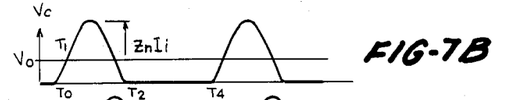

The steady state operation of the voltage-mode quasi-resonant boost converter as shown in FIG. 5C is divided into four switching stages starting from time $T_0$ when the switch $S_1$ is turned off. Before switch $S_1$ is turned off, it carries the input current $I_i$, diode $D_o$ is nonconductive and no current flows to the voltage load $V_o$. At time $T_0$, the switch $S_1$ turns off, initiating the first or capacitor charging state, wherein the flow of the input current $I_i$ is diverted through the capacitor $C_r$. If the switch $S_1$ as shown generally in FIG. 5C is replaced by a half-wave resonant switch as shown in FIG. 4C, the circuit current and voltage waveforms resulting from the half-wave operation are illustrated in FIGS. 7A, 7B, 7C, 7D and 7E. When the gate voltage $V_{gs}$ is removed from the switch $S_1$, assuming that the switch $S_1$ is a MOSFET $Q_1$ as shown in FIG. 5D, the MOSFET $Q_1$ is turned off at time $T_0$, whereby the current $I_i$ flow through the capacitor $C_r$ and the capacitor voltage $V_c$, as illustrated in FIG. 7B, rises linearly from time $T_0$ to time $T_1$. At time $T_1$, the capacitor voltage $V_c$ reaches $V_o$, whereby the diode $D_o$ is forward biased. The equivalent circuit of the first capacitor charging stage is shown in FIG. 6A, which indicates that the flow of current $I_i$ is through the capacitor $C_r$, with the constant voltage load $V_o$ being essentially disconnected therefrom.

Figure 7C:
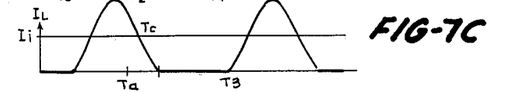
Figure 7D:
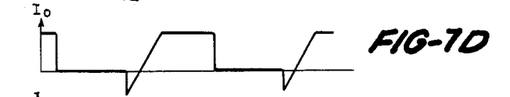
Figure 7E:
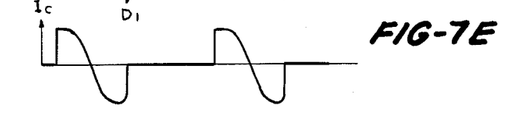

In the second resonant stage initiated at time $T_1$, the diode $D_o$ is rendered conductive at time $T_1$ whereby a portion of the input current $I_i$, i.e. the inductor current $I_L$, flows into the voltage load $V_o$. At time $T_1$, the current $I_L$ begins to flow through the inductor $L_r$, varying sinusoidally as shown in FIG. 7C. As shown in FIG. 7B, the capacitor voltage $V_c$ also varies from time $T_1$ to $T_2$ sinusoidally. In the half-wave mode as illustrated in FIG. 7, when the capacitor voltage $V_c$ drops to zero at time $T_2$, it is clamped at that voltage level by the anti-parallel diode $D_1$, which carries the reverse current. At time $T_c$, the inductor current $I_L$ is equal to the input current $I_i$, whereby the current through the anti-parallel diode $D_1$ is reduced to zero at time $T_c$ under the influence of the oscillating current $I_L$. Thus, it is seen that the gate voltage $V_{gs}$ must be applied to the gate of the MOSFET $Q_1$ in the interval between times $T_a$ ($=T_2$) and $T_c$. As seen in FIGS. 7D and 7C, the inductor current $I_L$ flows through the anti-parallel diode $D_1$ in the interval between times $T_a$ and $T_c$. At time $T_c$, the diode $D_1$ is turned off and current $I_Q$ would begin to flow through a conductive MOSFET $Q_1$, whereby the resonant capacitor $C_r$ would begin to recharge. If the MOSFET $Q_1$ is not turned on before time $T_c$, the capacitor voltage $V_c$ would begin to recharge and the MOSFET $Q_1$ would not turn on under zero-voltage conditions. To ensure that the gate voltage $V_{gs}$ is applied and the MOSFET $Q_1$ is turned on in the time period between times $T_a$ and $T_c$, the impedance values of the inductor $L_r$ and the capacitor $C_r$ are set such that the resonant frequency $F_n$ and the period from $T_0$ to $T_2$ is greater than the switching frequency $F_s$, whereby the rising edge of the gate voltage $V_{gs}$ will occur before time $T_c$.

Figure 8A:
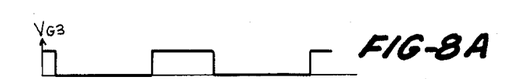
FIGS. 8A, 8B, 8C, 8D and 8E show circuit waveforms of the voltage-mode quasi-resonant boost converter as shown in FIG. 5C with a resonant subcircuit as shown in FIG. 4E as operating in a full wave-mode.
Figure 8B:
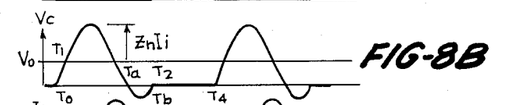
Figure 8C:
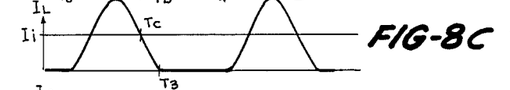
Figure 8D:
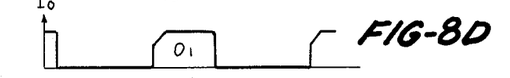
Figure 8E:
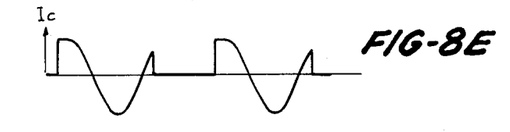

As shown in FIGS. 7B and 8B, the voltage $V_c$ comprises a DC component of the output voltage $V_o$ and an AC component according to the product of the characteristic impedance $Z_n$ and the input current $I_i$. Since the input current $I_i$ is proportional to the load or output current $I_o$ when the input voltage $V_i$ and the output voltage $V_o$ are fixed, the peak value of the capacitor voltage $V_c$ increases as the load current increases. To ensure that the capacitor voltage $V_c$ imposed on the MOSFET $Q_1$ returns to zero volts before switch turn on, the AC component must be larger than the DC component; to ensure that condition, the load current $I_o$ (and thus the input current $I_i$) must be maintained above and the load resistor $R_o$ below a certain level or otherwise the MOSFET $Q_1$ will not be switched on and off under zero-voltage conditions. The waveform of the transistor current $I_Q$, as shown in FIGS. 7D and 8D, is essentially square wave-like, and its peak value is the same as that of the input current $I_i$. The lower rms and dc value of the switch current $I_i$ is advantageous, since the conduction loss of the MOSFET $Q_1$ is kept minimal.

Figure 6B:
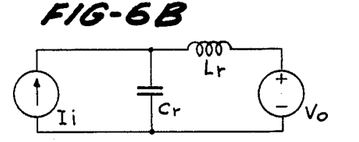

On the other hand, if the full-wave mode switch as shown in FIG. 4E is incorporated into the voltage-mode quasi-resonant boost converter as shown in FIG. 5C, the circuit waveforms appear as shown in FIG. 8. In particular as illustrated in FIG. 8B, the capacitor voltage in the resonant stage continues to oscillate past zero voltage level at time $T_a$, continuing negatively and returning to zero voltage level at time $T_b$. For the half-wave mode as illustrated in FIG. 7C, the second, resonant stage ends at time $T_a$. For the full-wave mode, the ending of the second resonant stage occurs at time $T_b$ ($=T_2$). The equivalent circuit of the resonant stage is illustrated in FIG. 6B, indicating that a resonant circuit comprised of the capacitor $C_r$ and the inductor $L_r$ is formed when the diode $D_o$ is forward-biased, thus interconnecting these elements and causing the inductor current $I_L$ and the capacitor voltage $V_c$ to vary sinusoidally as illustrated in FIGS. 7C (8C) and 7B (8B), respectively. In a manner as explained above, the values of the impedances of the resonant inductor $L_r$ and the resonant capacitor $C_r$ are selected to shape the waveform of the capacitor voltage $V_c$, as imposed across the MOSFET $Q_1$. In particular, the waveform of the capacitor voltage $V_c$ is shaped such that the leading edge of the gate voltage $V_{gs}$ occurs between time $T_a$ and $T_b$, as seen in FIG. 8B.

In the third, inductor discharging stage, starting at time $T_2$, the inductor current $I_L$ drops linearly and reaches zero at time $T_3$. In the half-wave mode of operation, as illustrated in FIG. 7, the capacitor voltage $V_c$ is clamped to zero by the anti-parallel diode $D_1$ and the switch $S_1$, both connected in parallel across the capacitor $C_r$ as shown in FIG. 5D, whereby the capacitor voltage $V_c$ is clamped to zero from time $T_2$ to time $T_3$. As illustrated in FIG. 7D, the anti-parallel diode $D_1$ is forward-biased at time $T_2$ when the capacitor voltage $V_c$ returns to zero, thus permitting a negative current flow through the anti-parallel diode $D_1$, as shown in FIG. 7D.

Figure 6C:
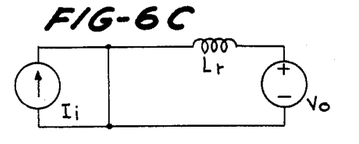

In the full-wave mode of operation whose waveforms are shown in FIG. 8, the MOSFET $Q_1$ is coupled in series with the diode $D_1$ as shown in FIG. 4E, whereby the diode $D_1$ is back-biased during the time interval between time $T_a$ and $T_b$, as shown in FIG. 8B, and blocks the negative voltage as would otherwise be applied to the MOSFET $Q_1$. As a result, the MOSFET $Q_1$ is permitted to turn on under zero-voltage conditions. The equivalent circuit of the inductor discharge stage is shown in FIG. 6C, wherein the inductor $L_r$ is coupled in series with the constant voltage load $V_o$ so that the inductor current $I_L$ decreases linearly in the time period between $T_2$ and $T_3$, and the capacitor $C_r$ is effectively shorted by the combined action in this time interval by the diode $D_1$ and the MOSFET $Q_1$.

Figure 6D:
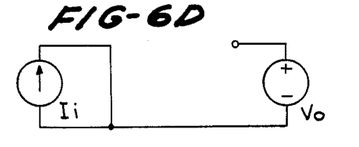

In the fourth, free-wheeling stage, the entire input current $I_i$ flows through the MOSFET $Q_1$, which is turned on by the application of the gate voltage $V_{gs}$ during this stage. The equivalent circuit shows in FIG. 6D the MOSFET $Q_1$ being rendered conductive to establish a short circuit across the input current source. As shown in FIGS. 7D and 8D, the transistor current $I_Q$ remains constant until the MOSFET $Q_1$ turns off again at time $T_4$.

Figure 10A:
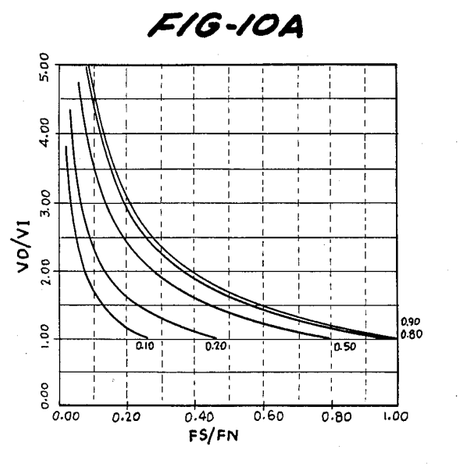
FIGS. 10A and 10B illustrate in graph form the DC voltage-conversion ratios, i.e. the ratio of the output voltage $V_o$ to the supply or the input voltage $V_i$ as a function of the ratio of the switching frequency $F_s$ to the resonant frequency $F_n$ of the voltage-mode quasi-resonant boost converter as shown in FIG. 5C as operating in a half-wave mode and a full-wave mode, respectively.
Figure 10B:
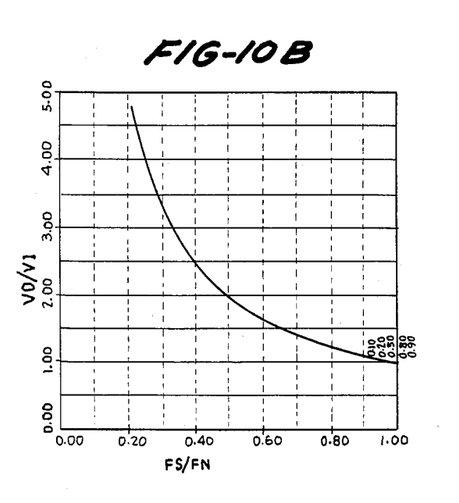

Expression of the peak voltage and peak current of the MOSFET $Q_1$ are readily determined, whereby the dc voltage-conversion ratio, i.e. the ratio of the output voltage $V_o$ to the supply or input voltage $V_i$, may be developed as a function of the resonant frequency $F_n$ and the switching frequency $F_s$, by equating the input energy per cycle and the output energy per cycle. These expressions have been plotted in the waveforms of FIGS. 10A and 10B, respectively for the half-wave mode and the full-wave mode of the voltage-mode quasi-resonant boost converter as shown in FIG. 5C. It can be seen that the voltage-conversion ratio in the full-wave mode is insensitive to load variations. However in the full-wave implementation including the full-wave resonance switch as shown in FIG. 4E, the diode $D_1$ is connected in series with the MOSFET $Q_1$ to provide a reverse-voltage blocking capability, as explained above. As a result, the energy stored in the junction capacitance of the MOSFET $Q_1$ is trapped by the series connected diode $D_1$ during the off-time and is dissipated internally after the MOSFET $Q_1$ is turned on. Thus, the full-wave mode of the voltage-mode quasi-resonant boost converter is not as efficient at high frequencies as that of the half-wave mode of the quasi-resonant boost converter.

This invention recognizes a duality between the voltage mode (zero-voltage switching) of operation and the current-mode (zero-current switching) of operation of a quasi-resonant converter. The duality relationship between these two modes of operation can be simply stated as follows: for the zero-current mode, the objective is to use an auxiliary LC resonant circuit such as shown in FIGS. 1A and 1B to shape the switching device's current waveform at on time in order to create a zero-current condition for the switching device to turn off. By contrast, the principals of duality would require that in the zero-voltage mode of operation that an auxiliary LC resonant circuit such as shown in FIGS. 4A through 4F shape the switching device's voltage waveform at off time in order to create a zero-voltage condition for the switch to turn on.

Figure 9A:
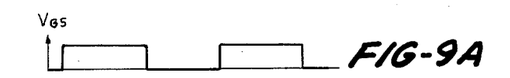
FIGS. 9A, 9B, 9C and 9D illustrate for comparison purposes the circuit waveforms of a current-mode quasi-resonant buck converter as shown in either FIGS. 2B or 2C as operating in its half-wave mode.
Figures 9B, 9C:
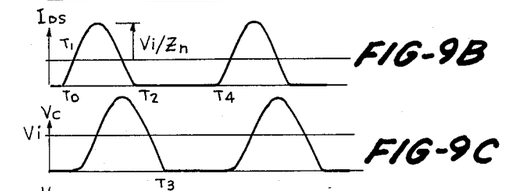
Figure 9D:
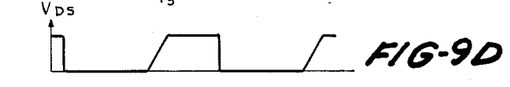

Taking the duality principal one step further, it is seen that the current-mode quasi-resonant buck converter of FIG. 2B is the dual of the voltage-mode quasi-resonant boost converter as described above in detail with respect to FIGS. 5C and 5D. The buck converter can be regarded as a voltage source supplying power to a current load, where a large inductor is connected in front of the load circuit. By contrast, as seen in the steady-state equivalent circuit of a boost converter as shown in FIG. 5B, the boost converter can be regarded as a current source supplying power to a voltage load. A comparison of the waveforms of FIGS. 7 showing the operation of the voltage-mode quasi-resonant boost converter as shown in FIG. 5B in a half-wave mode, to the waveforms of FIG. 9 showing the operation of the current-mode quasi-resonant buck converter of FIG. 2B, further illustrates the duality relationship of these two converters. For example, compare the sinusoidal waveform as shown in FIG. 7B of the voltage $V_c$ across the capacitor $C_r$ of the voltage-mode quasi-resonant boost converter of FIG. 5C, to the waveform as shown in FIG. 9B of the current $I_{ds}$ flowing through the switch $S_1$ as shown in FIG. 2B. Similarly note the comparison of the current $I_L$ as shown in FIG. 7C flowing through inductor $L_r$ to the waveform as shown in FIG. 9C of the capacitor voltage $V_c$ across the resonant capacitor $C_r$ of the current-mode buck converter. A comparison of FIGS. 9B and 7D contrasts the sinusoidal waveform of the switch current $I_{ds}$ of the current-mode buck converter, to the square wave-like waveform of the switching current $I_Q$ through the switch $S_1$ of the voltage-mode boost converter. Similarly, a comparison of waveforms 9D and 7B shows the sinusoidal shape of the voltage $V_{ds}$ across the switch $S_1$ and the resonant capacitor of the voltage-mode resonant boost converter, to the square wave-like waveform of the voltage $V_c$ across the switch $S_1$ of the current-mode buck converter.

FIG. 5D shows a detailed implementation of the voltage-mode quasi-resonant boost converter as generally shown in FIG. 5C. With the circuit characteristic impedance set at 100 ohm and its resonant frequency at 2 MHz, the illustrative values of the impedances of the circuit elements and the selected circuit elements are identified as follows:

$L_1$: 200 $\mu$H
$L_r$: 8. $\mu$H
$Q_1 + D_1$: IRF 730

$D_o$: IR 31DQ06
$C_r$: 800 pF
$C_o$: 10 μF

The switching device $Q_1$ is selected as an IRF-730 MOSFET. An external capacitor of 680 pF is connected in parallel with the MOSFET $Q_1$ to provide with the junction capacitance of the MOSFET $Q_1$, a resonant capacitance of $C_r$ of 800 pF. The boost converter of FIG. 5D has been operated with an input voltage of 20 V, an output voltage of 28.7 V, and at a frequency of 1 MHz to achieve an efficiency of 92 percent and to output 16 watts of power.

Figure 11A:
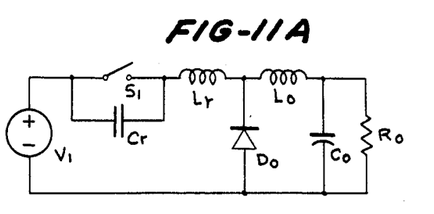
FIGS. 11A, 11B and 11C show respectively a zero-voltage quasi-resonant buck converter in generalized form, a zero-voltage quasi-resonant buck converter incorporating an unidirectional switch as operating in a full-wave mode, and a zero-voltage quasi-resonant buck converter incorporating a bidirectional switch as operating in a half-wave mode.
Figure 11B:
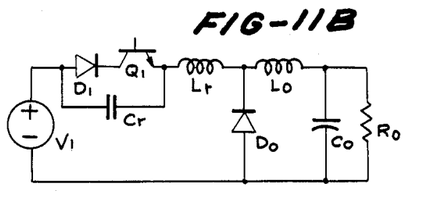
Figure 11C:
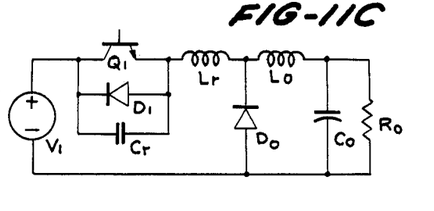

The zero-voltage switching mode can be readily applied to the operation as a buck-type converter as generally shown in FIG. 11A. A switch $S_1$ is MOSFET (or a bipolar transistor) $Q_1$ with a series diode $D_1$ (full-wave mode configuration), as shown in FIG. 11B, or a MOSFET $Q_1$ with an anti-parallel diode $D_1$ (half-wave mode configuration) as shown in FIG. 11C. An output inductor $L_o$ and an output capacitor $C_o$ serve as filter elements. A diode $D_o$ carries the free-wheeling current for the output inductor $L_o$ during the turn off period. If the output $L_o$ is large enough, the current it carries can be treated as constant. Apart from a conventional buck converter, the resonant inductor $L_r$ and the resonant capacitor $C_r$ are added to the circuit to induce the zero-voltage switching effect. The circuit's dynamic behavior is characterized by the resonant elements $L_r$ and $C_r$, as they define the resonant frequency $F_r = \frac{1}{2}(2\pi\sqrt{L_rC_r})$, and the characteristic impedance $Z_n = \sqrt{L_r/C_r}$.

Figure 12A:
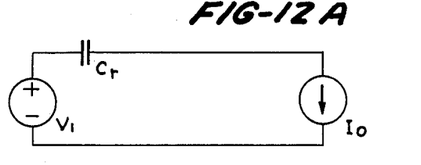
FIGS. 12A, 12B, 12C and 12D show respectively the equivalent circuits of the voltage-mode quasi-resonant buck converter as shown in FIG. 11B.
Figure 12B:
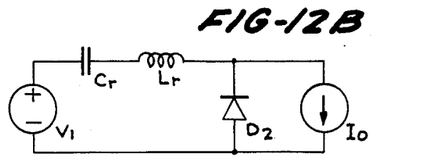

During a steady-state operation, as will be explained with respect to the waveforms of FIGS. 13 and 14, the transistor $Q_1$ is carrying the output current $I_o$ before it turns off. When it turns off at time $T_0$, $I_o$ is diverted through the resonant capacitor $C_r$. Since the output current $I_o$ is dominated by the output inductor $L_o$, it remains constant until time $T_1$ when the capacitor voltage $V_c$ rises to the input voltage level $V_i$ and the diode $D_o$ starts to cut in, as seen in the equivalent circuit of FIG. 12A. After time $T_1$, part of the output current $I_o$ starts to free wheel through the diode $D_o$, and the resonant interaction between the inductor $L_r$ and the capacitor $C_r$ takes place, as evident from the equivalent circuit of FIG. 12B. Voltage $V_c$ and current $I_L$ oscillate in a sinusoidal manner.

Figure 12C:
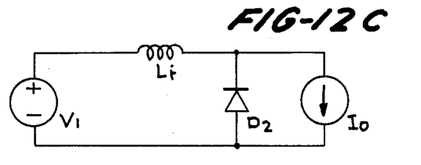
Figure 13A:
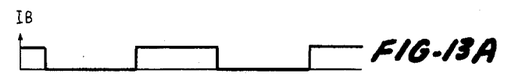
FIGS. 13A, 13B, 13C, 13D and 13E show circuit waveforms of the voltage-mode quasi-resonant buck converter as shown in FIG. 11C as operating in its half-wave mode.
Figure 13B:
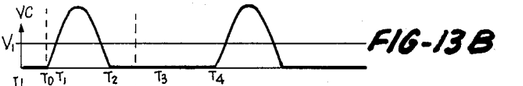
Figures 13C, 13D:
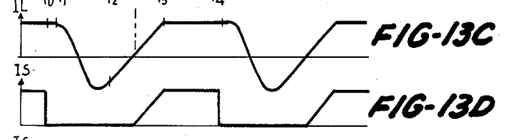
Figure 13E:
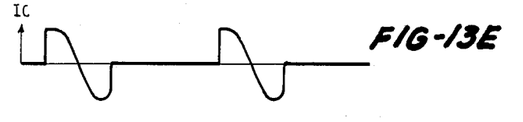

If switch $S_1$ is a half-wave mode implementation (with an anti-parallel diode $D_1$ as shown in FIG. 11B), the voltage $V_c$ will drop to zero at time $T_2$, as shown in FIG. 13B, and is clamped at that value by diode $D_1$. The inductor current $I_L$ keeps feeding back to the source $V_i$ through the diode $D_o$. Transistor $Q_1$ can turn on under zero-voltage condition and thus provides a path for the inductor current $I_L$, when it is back in the forward direction as forced by the voltage source $V_i$. At time $T_3$, the inductor current $I_L$ rises to the $I_o$ level, and is clamped at that value by the inductor $L_o$. The equivalent circuit between $T_2$ and $T_3$ is shown as in FIG. 12c, and the waveforms for the half-wave mode configuration are shown in FIG. 13.

Figure 12D:
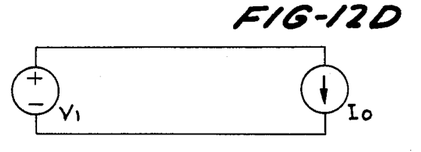
Figure 14A:
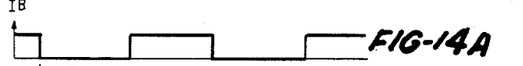
FIGS. 14A, 14B, 14C, 14D and 14E show respectively the circuit waveforms of the voltage-mode quasi-resonant boost converter as shown in FIG. 11B operating in its full-wave mode.
Figures 14B, 14C, 14D:
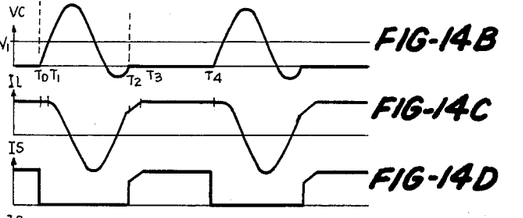
Figure 14E:
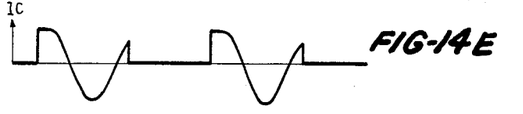

On the other hand, if switch $S_1$ is a full-wave mode resonant switch (with a series anti-parallel diode $D_1$ as shown in FIG. 11C), the capacitor voltage $V_c$ will swing negatively and return to zero at time $T_2$, as shown in FIG. 14B. Thus, the transistor $Q_1$ can turn on under zero voltage conditions with the anti-parallel diode $D_1$ blocking the negative voltage. The transistor $Q_1$ takes over the inductor current $I_L$ after time $T_2$, as shown in FIG. 14C. At time $T_3$, the inductor $I_L$ reaches the $I_o$ level, as seen in FIG. 14C. At time $T_4$, the transistor $Q_1$ turns off again as seen in FIG. 14A, starting the next switching cycle. The equivalent circuit between times $T_3$ and $T_4$ is shown as in FIG. 12D.

From the standpoint of minimizing the turn on loss, the transistor $Q_1$ should turn on when the capacitor voltage $V_c$, also applied across the switch $Q_1$, oscillates to or below a zero value. Since the turn off dynamics are largely confined by the resonant frequency $F_n$, the turn off duration is relatively fixed and only the turn on duration is available for modulation to achieve the voltage regulation against the load and source variations. In other words, a constant off time control scheme is adopted.

Figure 15:
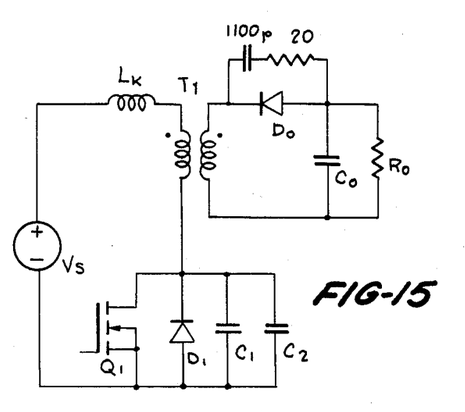
FIG. 15 is a detailed circuit diagram of a voltage-mode quasi-resonant flyback converter employing a transformer and employing the leakage inductance of a transformer and the junction capacitance of the semiconductor switch to form a resonant tank circuit.

In high-frequency operation, circuit parasitics such as leakage inductances of transformers and junction capacitances of the semiconductor devices are usually detrimental to the circuit operation. However as described in the above-referenced application entitled "RESONANT CONVERTERS WITH SECONDARY-SIDE RESONANCE", certain voltage mode quasi-resonant converter topologies can utilize these intrinsic parasitic elements to implement a desired resonant mode of operation. FIG. 15 shows a voltage-mode quasi-resonant flyback converter, which utilizes the transformer's leakage inductances and the semiconductor's junction capacitance to form a resonant tank circuit. This circuit contains the fewest coponents possible. The resonant flyback converter of FIG. 15 includes a transformer $T_1$ having a primary winding connected to the input voltage $V_s$. The inductor $L_k$ is indicative of the leakage inductance reflected to the primary winding of the transformer. The other terminal of the primary winding is coupled to a switch in the form of a MOSFET $Q_1$ and an anti-parallel diode $D_1$, and capacitors $C_1$ and $C_2$, all connected in parallel with the MOSFET $Q_1$. The transformer secondary winding is coupled via a filter to the output capacitor $C_o$ and the load resistor $R_o$; the rectifier is comprised of a series connected capacitor and resistor coupled in parallel with a diode $D_o$. A 5 MHz, 25 W, 50 V to 5 V breadboard circuit based on this topology has been implemented as shown in FIG. 15, with the following impedance values and elements:

Transformer: TDK P2213-H6F/A250 8 T/1 T
$L_K$: 1.4 μh
$Q_1 + D_1$: IRF-720
$D_o$: IR-31DQo6*2
$C_1$ ($C_{oss}$ of $Q_1$): 100 pF
$C_2$: 82 pF
$C_o$: 10 μF Since the current waveform has a flat top in the zero-voltage switching technique, it allows the use of a MOSFET with a relatively low current rating. Assume 80 percent efficiency and 50 percent equivalent duty cycle. At 25 W, the peak value of the switch current is 1.25 A when the input voltage is 50 V. A small MOSFET IRF-720 is used. Despite its high on-state resistance (1.8 ohm), the conduction loss is still low. For the transformer, a TDK P2213-H6F/A250 pot-core is used with 8 turns on the primary winding and one turn on the secondary winding. The measured leakage inductance, referring to the primary-side is about 1.1 μH. Taking the stray inductances into account, the total value of $L_r$ is estimated to be about 1.4 μH. The output junction capacitance of IRF-720 is about 100 pF when measured at 100 V and above. The resonant capacitor includes the output junction capacitance and a trimmer capacitor of 82 pF, to provide a composite, resonant capacitance $C_r$ of a value of 180 pF. The characteristic impedance and resonant frequency are calculated to be 88.2 ohm, and 10.03 MHz, respectively.

Figure 16A:
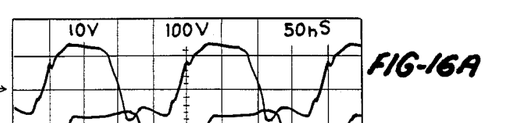
FIGS. 16A, 16B, 16C, 16D, 16E, 16F, 16G, 16H and 16I show circuit waveforms of the voltage-mode quasi-resonant flyback converter of FIG. 15 as operating at various input voltages $V_i$, output voltages $V_0$ and input currents $I_o$.
Figure 16B:
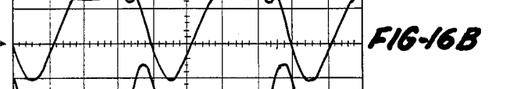
Figure 16C:
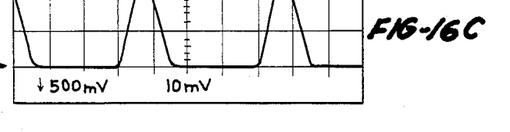
Figure 16D:
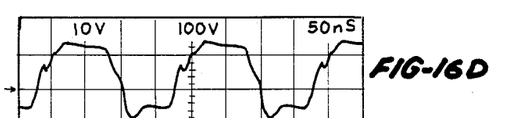
Figure 16E:
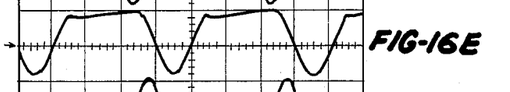
Figure 16F:
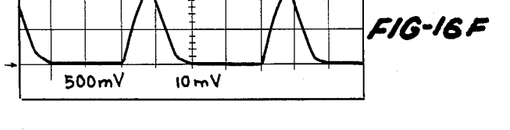
Figure 16G:
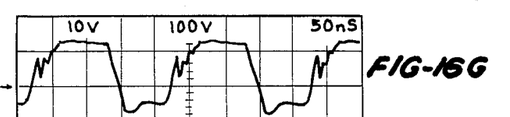
Figure 16H:
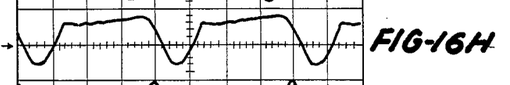
Figure 16I:
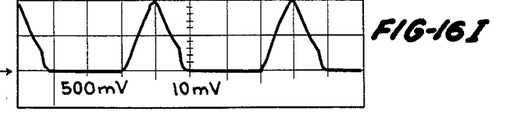
Figure 17A:
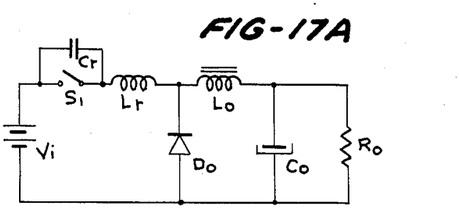
FIGS. 17A to 17F show a family of buck quasi-resonant converters operating under zero-voltage conditions at switch turn on in accordance with the teachings of this invention.
Figure 17B:
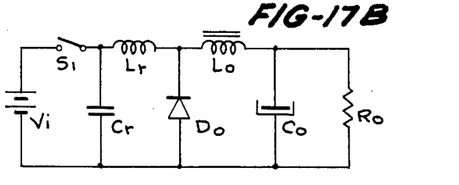
Figure 17C:
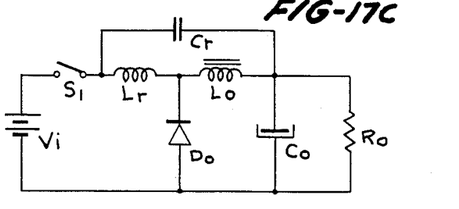
Figure 17D:
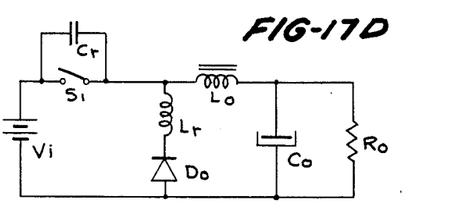
Figure 17E:
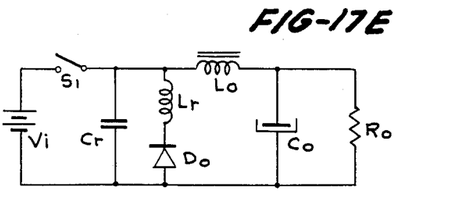
Figure 17F:
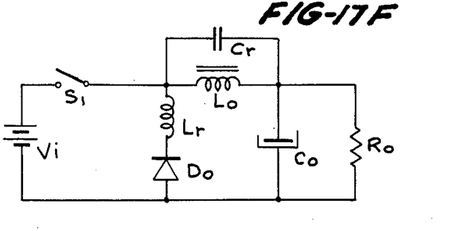
Figure 18A:
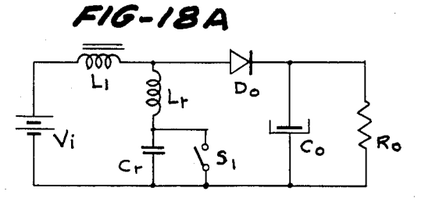
FIGS. 18A to 18F show a family of boost quasi-resonant converters operating under zero-voltage conditions at switch turn on in accordance with the teachings of this invention.
Figure 18B:
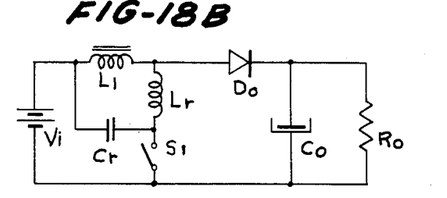
Figure 18C:
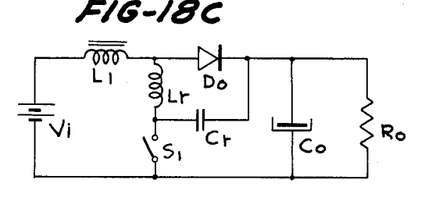
Figure 18D:
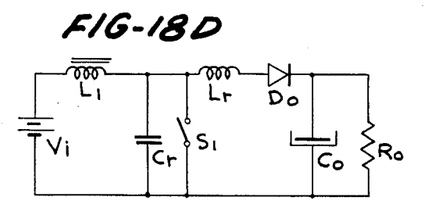
Figure 18E:
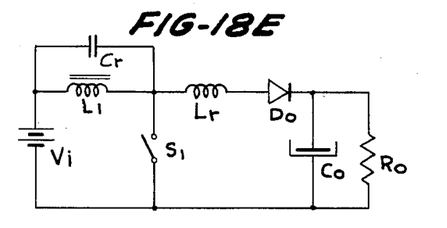
Figure 18F:
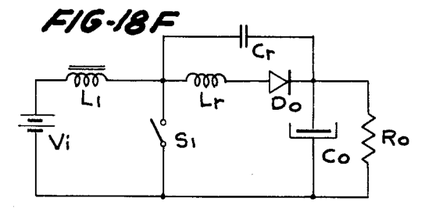
Figure 19A:
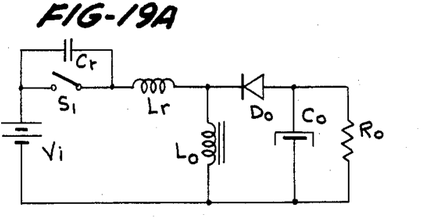
FIGS. 19A to 19F show a family of buck-boost quasi-resonant converters operating under zero-voltage conditions at switch turn on in accordance with the teachings of this invention.
Figure 19B:
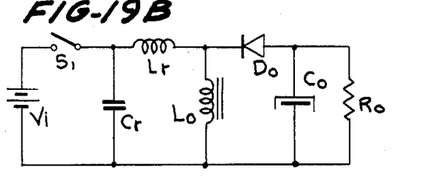
Figure 19C:
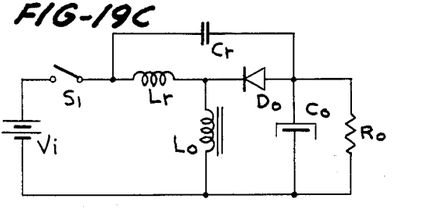
Figure 19D:
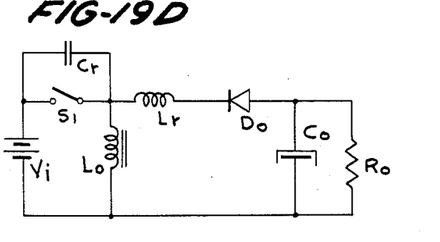
Figure 19E:
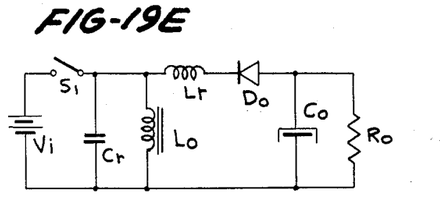
Figure 19F:
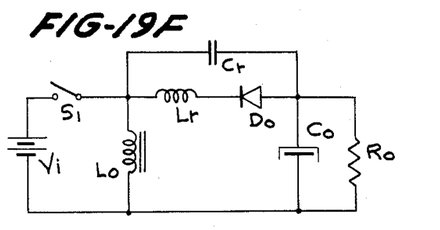
Figure 20A:
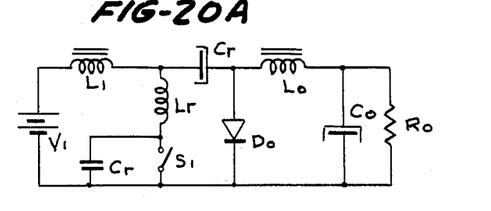
FIGS. 20A through 20O show a family of boost-buck quasi-resonant converters operating under zero-voltage conditions at switch turn on in accordance with the teachings of this invention.
Figure 20B:
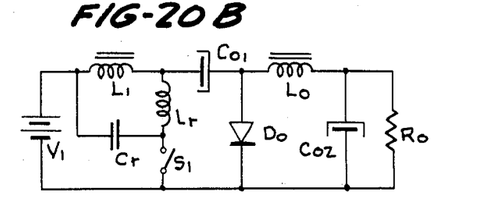
Figure 20C:
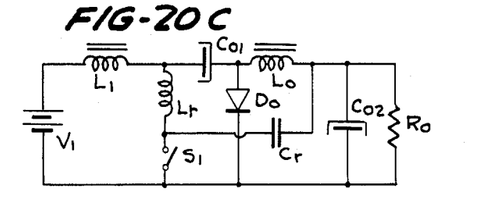
Figure 20D:
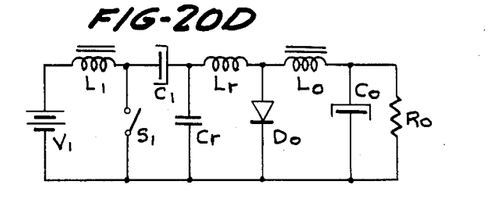
Figure 20E:
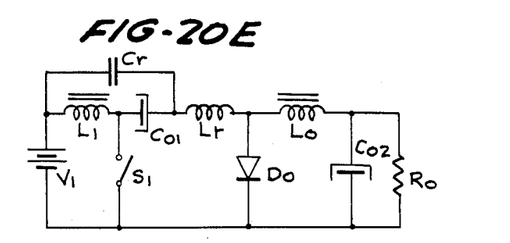
Figure 20F:
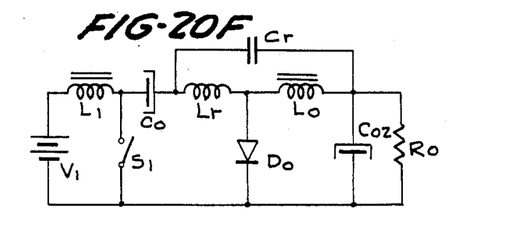
Figure 20G:
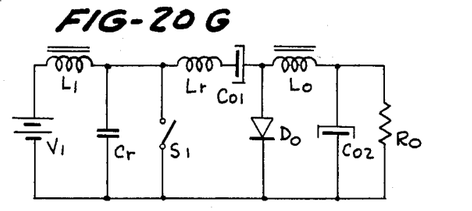
Figure 20H:
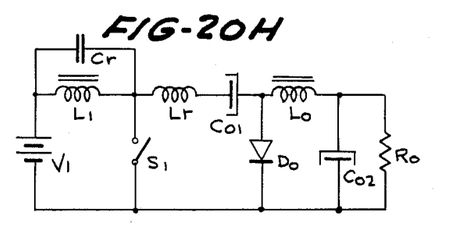
Figure 20I:
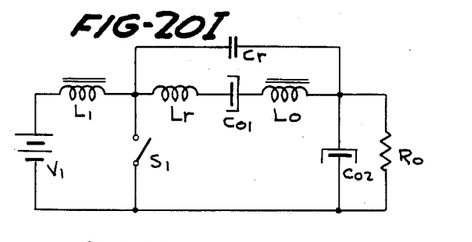
Figure 20J:
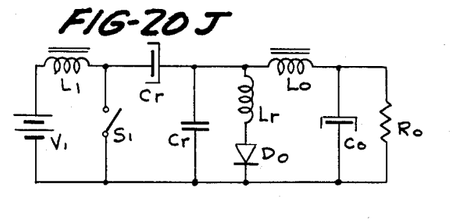
Figure 20K:
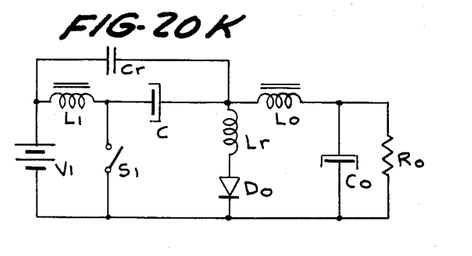
Figure 20L:
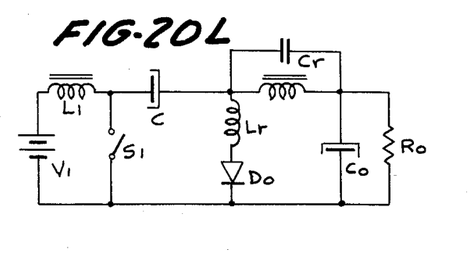
Figure 20M:
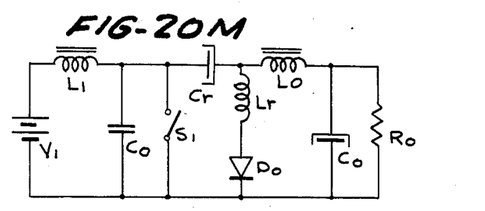
Figure 20N:
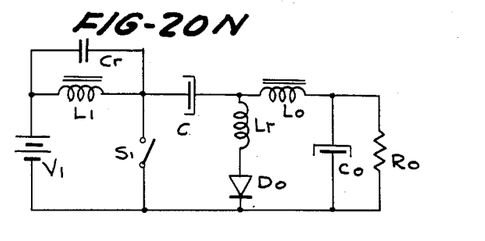
Figure 20O:
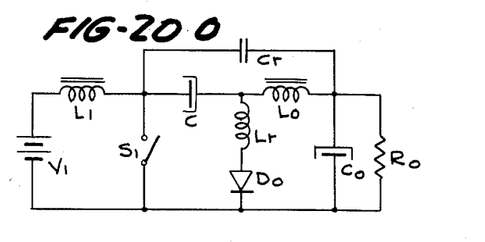

The voltage-mode quasi-resonant flyback converter of FIG. 15 operates at 5 MHz with voltage and current waveforms illustrated in FIGS. 16A through 16I for three load conditions. FIGS. 16A, 16B and 16C respectively show the waveforms for the gate-source voltage $V_{GS}$, the current $I_{SM}$ and the drain-source voltage $V_{DS}$, where the input voltage $V_i$ is 50 volts, the output voltage load $V_o$ is 5 volts, the output current $I_o$ is 4.9 A. Similarly, FIGS. 16D, 16E, and 16F represent the voltage $V_{GS}$, the current $I_{SM}$ and the voltage $V_{DS}$, where the circuit is operated at an input voltage $V_i$ of 50 volts, the output voltage $V_o$ of 6.3 volts and the output current $I_o$ is 2.9 A. The waveforms of FIGS. 16G, 16H and 16I respectively show the voltage $V_{GS}$, the current $I_{SM}$, and the voltage $V_{DS}$, where the circuit is operated at an input voltage $V_i$ of 50 volts, the output voltage load $V_o$ of 7.5 volts and the output current $I_o$ of 1.8 A. When the load current $I_o$ is too low, as illustrated in FIG. 16H, the drain-source voltage $V_{DS}$ will not be able to oscillate to zero as shown in FIG. 16I. The turn on at a non-zero voltage condition leads to a noticeable switching ringing due to the Miller effect, which occurs in the gate-source voltage $V_{DS}$, as seen in FIG. 16G.

While not severe in lower switching frequencies, the capacitive turn on loss due to discharging the voltage stored in the parasitic junction capacitances of power MOSFETs becomes a dominating factor when the switching frequency is raised to the megahertz range. For example, a junction capacitance of 100 pF, switching at 300 V, will induced a turn on loss of 4.5 watts at 1 MHz and 22.5 watts at 5 MHz.

Figure 21A:
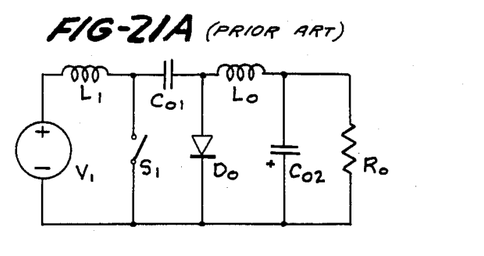
FIG. 21A shows a CUK converter in accordance with the prior art.
Figure 21B:
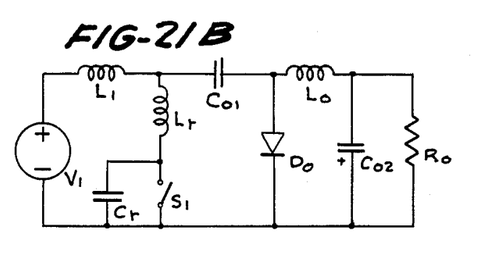
FIGS. 21B and 21C show a family of CUK quasi-resonant converters operating under zero-voltage conditions at switch turn on in accordance with the teachings of this invention.
Figure 21C:
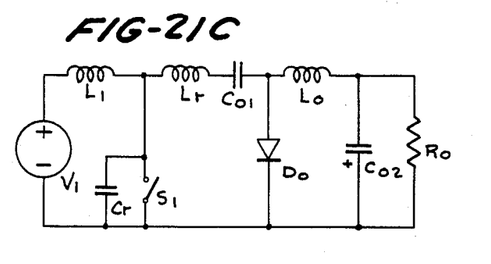
Figure 22A:
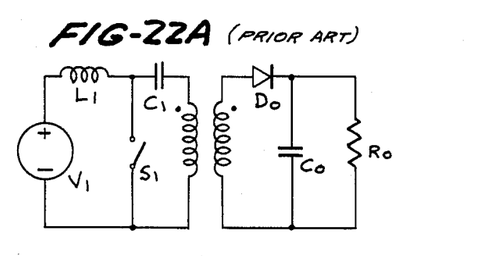
FIG. 22A shows a SEPIC converter in accordance with the prior art.
Figure 22B:
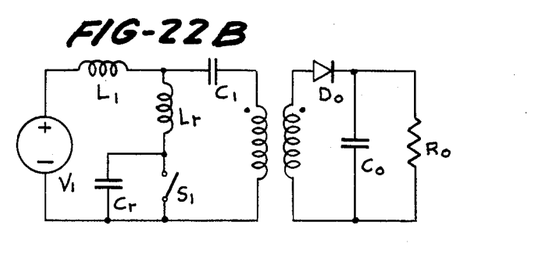
FIGS. 22B and 22C show a family of SEPIC quasi-resonant converters operating under zero-voltage conditions at switch turn on in accordance with the teachings of this invention.
Figure 22C:
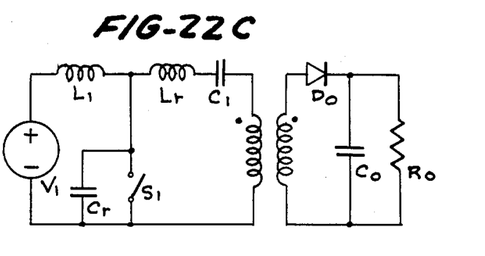
Figure 23A:
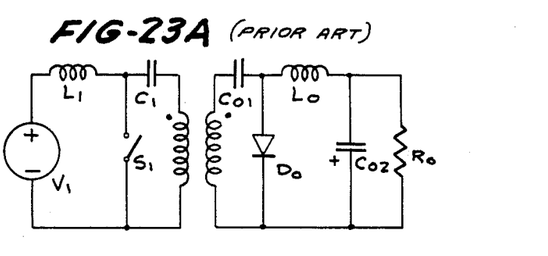
FIG. 23A shows a CUK converter including a transformer in accordance with the prior art.
Figure 23B:
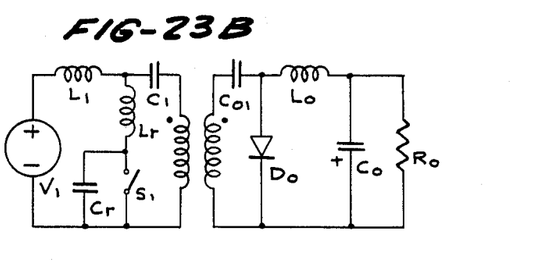
FIGS. 23B and 23C show a family of CUK quasi-resonant converters including a transformer and operating under zero-voltage conditions at switch turn on in accordance with the teachings of this invention.
Figure 23C:
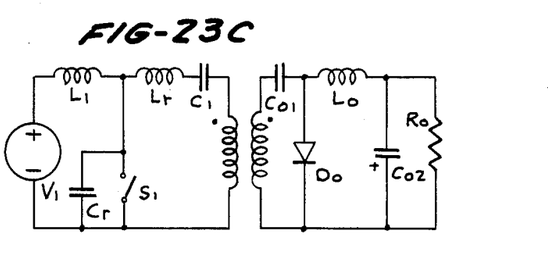

A limited number of embodiments of a zero-voltage quasi-resonant converter are described in detail above. However, it is understood that the principals of this invention may be applied to a large number of different types of converters, as will now be illustrated. In FIGS. 17, a conventional buck converter has been modified by including one of the subcircuits as shown in FIG. 4A or 4B, wherein similar elements are similarly designated. FIG. 18 similarly show a family of boost quasi-resonant converters similar to prior art boost converters, but modified to include one of the resonant subcircuits as shown in FIG. 4A or 4B, with similar elements bearing notations similar to that previously used. FIG. 19 illustrate a further family of buck-boost quasi-resonant converters, similar to the buck-boost converters of the prior art, but modified to include one of the resonant subcircuits as shown in FIG. 4A or 4B, with similar elements bearing similar notations as previously used. FIG. 20 show a still further family of boost-buck quasi-resonant converters resembling boost-buck converters of the prior art, yet modified to include a resonant subcircuit as shown in FIG. 4A or 4B, with similar elements bearing notation similar to that previously used. In FIG. 21A, there is shown a conventional CUK converter, whereas FIGS. 21B and 21C show a family of CUK quasi-resonant converters similar to the prior art CUK converter as shown in FIG. 21A, but modified to include one of the resonant subcircuits as shown in FIGS. 4A or 4B, with similar elements bearing notations similar to that previously used. FIG. 22A shows a conventional SEPIC converter in accordance with the prior art. FIGS. 22B and 22C show a family of SEPIC quasi-resonant converters similar to the boost converter of FIG. 22A, but modified to include one of the resonant subcircuits as shown in FIG. 4A or 4B, with similar elements bearing notations similar to that previously used. In FIG. 23A, there is shown a conventional CUK converter including a transformer as known in the prior art. FIGS. 23B and 23C show a family of CUK quasi-resonant converters as including a transformer and one of the resonant subcircuits as shown in FIG. 4A or 4B, with similar elements bearing similar notations as previously used.

Thus, there has been described a zero-voltage switching method that substantially reduces the switching stresses and losses. Elimination of such switching losses and stress achieves high efficiency, also, keeping the device's conduction losses minimal. The eliminated switching losses include the loss internal to the device due to the abrupt discharging of the junction capacitances, when the device is turned on. This internal loss becomes significant when the switching frequency exceeds 1 megahertz in a PWM converter, a conventional resonant converter or a zero-current switching quasi-resonant converter. Further, this zero-voltage method of operation eliminates dv/dt noise within the switching device, as well as noise which is often coupled to the drive circuit by means of the Miller effect, as would otherwise limit the circuits operation at very high frequencies. In addition, this zero-voltage method of operation may be achieved by LC circuits including the parasitic elements in the transformer leakage inductance and the semiconductor junction capacitance. As a result, the circuit configuration of the voltage-mode quasi-resonant converter of this invention are remarkably simple. These voltage-mode quasi-resonant converters have been operated at frequencies as high as 5 MHz to produce 25 watts with total losses as low as 5 watts.

In considering this invention, it should be remembered that the present disclosure is illustrative only and the scope of the invention should be determined by the patented claims.

We claim:

1. A quasi-resonant converter comprising:
    (a) a power source;
    (b) a load;
    (c) a low pass filter formed from at least an inductor and a capacitor for filtering a signal applied to said load; and
    (d) a resonant switch means including:
        (1) a switch for connecting said power source to said load and for disconnecting said power source from said load, said switch operative in an on state and in an off state, and
        (2) a resonant capacitor and a resonant inductor coupled together at a common node to form a resonant circuit said common node being operatively connected to said switch, said resonant circuit for imposing a voltage waveform across said switch, said resonant circuit coupled to said switch, and said resonant capacitor and said resonant inductor having respective impedances selected to shape said voltage waveform such that a zero-voltage condition is imposed upon said switch when said switch is disposed to its on state.

2. The quasi-resonant converter as claimed in claim 1, wherein there is included means for disposing said switch to its on state and then to its off state in periodic cycles at a selected switching frequency $F_s$.

3. The quasi-resonant converter as claimed in claim 2, wherein said off state of each cycle is of a selected period.

4. The quasi-resonant converter as claimed in claim 3, wherein said off period is determined by the impedances respectively of said resonant capacitor and said resonant inductor.

5. The quasi-resonant converter as claimed in claim 1, wherein said switch is disposed to its on state for connecting said power source to said load and for imposing said voltage waveform across said switch, and disposed to its off state for disconnecting said power source from said load.

6. The quasi-resonant converter as claimed in claim 1, wherein said switch is disposed to its off state for connecting said power source to said load and for imposing said voltage waveform across said switch, and is disposed to its on state for disconnecting said power source from said load.

7. The quasi-resonant converter as claimed in claim 1, wherein said switch comprises a bipolar transistor.

8. The quasi-resonant converter as claimed in claim 1, wherein wherein said switch comprises an FET.

9. The quasi-resonant converter as claimed in claim 1, wherein said switch is disposed to its on state to permit a current flow in a first direction from said voltage source to said load and to block the current flow in a second, opposite direction, and disposable to its off state to block the current flow in said first direction, for operating said quasi-resonant converter in a full-wave mode.

10. The quasi-resonant converter as claimed in claim 9, wherein said switch comprises a semiconductor switch disposable to its on state to permit a current flow in said first direction, and a diode coupled in series with said semiconductor switch to block the current flow in said second direction.

11. The quasi-resonant converter as claimed in claim 1, wherein said resonant capacitor is coupled in parallel with said switch to form a parallel circuit, and said resonant inductor is coupled in series with said parallel circuit.

12. The quasi-resonant converter as claimed in claim 11, wherein said switch comprises a FET.

13. The quasi-resonant converter as claimed in claim 11, wherein said switch comprises a bipolar transistor.

14. The quasi-resonant converter as claimed in claim 1, wherein said switch comprises a transistor and a diode coupled in series with each other to form a series circuit, said switch being disposable to its on state, whereby said transistor is rendered conductive to permit a current flow in a first direction from said power source via said conductive transistor and said diode to said load, said resonant capacitor coupled in parallel with said series circuit to form a parallel circuit, and said resonant inductor connected in series with said parallel circuit, whereby said quasi-resonant converter is operative in a full-wave mode.

15. The quasi-resonant converter as claimed in claim 14, wherein said transistor is a bipolar transistor.

16. The quasi-resonant converter as claimed in claim 14, wherein said transistor is a FET.

17. The quasi-resonant converter as claimed in claim 1, wherein said switch comprises a transistor and a diode coupled in series with each other to form a first series circuit, said switch being disposable to its on state, whereby said transistor is rendered conductive to permit current flow in a first direction from said power source via said conductive transistor and said diode to said load, said resonant capacitor coupled in series with said power source to form a second series circuit, said second series circuit coupled in parallel with said first series circuit to form a parallel circuit, and said resonant inductor coupled in series with said parallel circuit, whereby said quasi-resonant converter is operative in a full-wave mode.

18. The quasi-resonant converter as claimed in claim 1, wherein said switch comprises a transistor and a diode connected in anti-parallel across said transistor and said resonant capacitor to form a parallel circuit, said resonant inductor connected in series with said parallel circuit, said switch disposable to its on state to render said transistor conductive to permit a current flow in a first direction from said power source to said load and disposable to its off state to render said transistor non-conductive, said diode is disposed to permit the current flow in a second, opposite direction, whereby said quasi-resonant converter is operative in a half-wave mode.

19. The quasi-resonant converter as claimed in claim 18, wherein said transistor is a bipolar transistor.

20. The quasi-resonant converter as claimed in claim 18, wherein said transistor is a FET.

21. The quasi-resonant converters as claimed in claim 1, wherein said resonant capacitor is connected in series with said power source to form a first series circuit, said switch comprises a transistor and a diode connected in anti-parallel across said transistor and said first series circuit to form a parallel circuit, said resonant inductor connected in series with said parallel circuit, said switch disposable to its first state to render said transistor conductive to permit a current flow in a first direction from said power source to said load and disposable to its off state to render said transistor nonconductive, said diode is disposed to permit the current flow in a second, opposite direction, whereby said quasi-resonant converter is operative in a half-wave mode.

22. The quasi-resonant converter as claimed in claim 1, wherein said power source comprises a voltage source and an input inductor coupled in series with said power source to provide a series circuit, said input inductor having an impedance sufficiently large to output a substantially constant level current from said series circuit, said resonant capacitor and said switch being connected in parallel with said series circuit to form a parallel circuit, said resonant inductor being connected in series with said parallel circuit, said load comprising an output diode coupling said resonant inductor to an output capacitor and an output resistor coupled in parallel with said output capacitor, whereby a quasi-resonant boost converter is formed.

23. The quasi-resonant converter as claimed in claim 22, wherein said switch comprises a transistor and a diode coupled in anti-parallel with each other and in parallel with said resonant capacitor to operate in a half-wave mode.

24. The quasi-resonant converter as claimed in claim 22 wherein said switch comprises a transistor and a diode connected in series with each other to form a second series circuit connected in parallel with said resonant capacitor, whereby said quasi-resonant converter operates in a full-wave mode.

25. The quasi-resonant converter as claimed in claim 1, wherein said load comprises an output diode, an output capacitor connected in series with an output inductor to form a series circuit coupled in parallel with said output diode, and an output resistor coupled in parallel with said output capacitor, said resonant switch circuit is configured such that said resonant capacitor is coupled in parallel with said switch to form a parallel circuit, and said resonant inductor is coupled in series with said parallel circuit and to the point of interconnection between output diode and said output inductor to form thereby a quasi-resonant buck converter.

26. The quasi-resonant converter as claimed in claim 25, wherein said switch comprises a transistor and a diode connected in series with said transistor to form a second series circuit coupled in parallel with said resonant capacitor to permit said quasi-resonant converter to operate in a full-wave mode.

27. The quasi-resonant converter as claimed in claim 25, wherein said switch comprises a transistor and a diode coupled in anti-parallel with said transistor and said resonant capacitor to form a second parallel circuit, said resonant inductor coupled in series with said second parallel circuit, whereby said quasi-resonant converter operates in a half-wave mode.

28. The quasi-resonant converted as claimed in claim 1, wherein there is included a transformer having a primary winding and a secondary winding, said transformer exhibiting a characteristic leakage inductance, said load being coupled to said secondary winding and comprising an output capacitor, an output resistor and an output rectifier diode coupled in series with said output capacitor, said output resistor being coupled in parallel with said output capacitor, said switch operable in its on state for coupling said power source to said primary winding, for delivering a charging current to said secondary winding and to said load, said resonant inductance comprising said leakage inductance and being coupled to said resonant capacitor to form said resonant circuit.

29. The quasi-resonant converter as claimed in claim 28, wherein said resonant capacitor is connected in parallel to said switch to form a parallel circuit, said parallel circuit being connected to said primary winding of said transformer.

30. The quasi-resonant converter as claimed in claim 28, wherein said switch comprises a transistor and a diode coupled in parallel with said resonant capacitor to form a parallel circuit, said parallel circuit connected to said primary winding of said transformer.

31. The quasi-resonant converter as claimed in claim 28, wherein said switch comprises a transistor and a diode coupled in parallel with each other to form a parallel circuit, said parallel circuit coupled in series with said power source and said resonant capacitor to form a series circuit, said series circuit is coupled to said primary winding of said transformer.

32. The quasi-resonant converter as claimed in claim 28, wherein said switch comprises a transistor and a diode connected in series with said transistor to form a series circuit, said resonant capacitor connected in parallel with said series circuit to form a parallel circuit, said parallel circuit connected to said primary winding of said transformer, whereby said quasi-resonant flyback converter operates in a full-wave mode.

33. The quasi-resonant converter as claimed in claim 28, wherein said switch comprises a transistor and a diode connected in series with each other to form a first series circuit, said resonant capacitor connected in series with said power source to form a second series circuit, said second series circuit connected in parallel with said first series circuit to form a parallel circuit, said parallel circuit connected to said primary winding of said transformer, whereby said quasi-resonant flyback converter operates in a full-wave mode.

34. A quasi-resonant converter comprising:
(a) a power source;
(b) a load;
(c) a low pass filter formed from at least an indicator and a capacitor for filtering said load; and
(d) a resonant switch means comprising:
  (1) switch for connecting said power source to said load and for disconnecting said power source from said load, said switch operative in an on state and in an off state,
  (2) a resonant capacitor and a resonant inductor coupled together to form a resonant circuit for imposing a voltage waveform across said switch, said resonant circuit coupled to said switch, and said resonant capacitor and said resonant inductor having respective impedances selected to shape said voltage waveform such that a zero-voltage condition is imposed upon said switch when said switch is disposed to its on state, and wherein said resonant capacitor is coupled to said switch and said resonant indicator to shape said voltage waveform such that a zero-voltage condition is imposed upon said switch when said switch is disosed in its off state; and
  (3) means for disposing said switch to its on state and then to its off state in periodic cycles at a switching frequency $F_s$ in excess of 1 MHz.

35. A quasi-resonant converter comprising:
(a) a power source;
(b) a load;
(c) a low pass filter formed from at least an inductor and a capacitor for filtering a signal applied to said load; and
(d) a resonant switch circuit including:
  (1) a switch for connecting said power source to said load and for disconnecting said power source from said load, said switch operative in an on state and in an off state, in periodic cycles at a selected switching frequency $F_s$, and
  (2) a resonant capacitor and a resonant inductor coupled together to form a resonant circuit for imposing a voltage waveform across said switch, said resonant circuit coupled to said switch, and said resonant capacitor and said resonant inductor having respective impedances selected to shape said voltage waveform such that a zero-voltage condition is imposed upon said switch when said switch is disposed to its on state and wherein said switch is disposed to its off state to simultaneously impose said voltage waveform across said switch, said impedances of said resonant capacitor and resonant inductor reing selected to form said voltage waveform such that said voltage waveform is at substantially zero volts when said switch is next disposed to its on state.

36. The quasi-resonant converter as claimed in claim 35 wherein said impedances of said resonant capacitor and said resonant inductor are selected respectively to produce a resonant frequency $F_r$ of said resonant circuit greater than said switching frequency $F_s$.

37. The quasi-resonant converter as claimed in claim 36, wherein said power source provides an input current and said load includes a resistive component, said input current and said resistive component being set to exceed respectively a minimum value and to be less than a maximum value, whereby said voltage waveform imposes said zero-voltage condition on said switch.

38. The quasi-resonant converter as claimed in claim 37, wherein an output voltage is developed across said load and said converter has a characteristic impedance defined by the square root of the impedances of said resonant capacitor and said resonant inductor, said voltage waveform comprising a DC component and an AC component according to the product of said input current and said characteristic impedance, said input current and said characteristic impedance being selected such that said voltage waveform imposes said zero-voltage condition upon said switch when said switch is disposed to its on state.

39. The quasi-resonant converter as claimed in claim 1, an output current flows through said load, said output current being set to exceed a minimum value, whereby said voltage waveform imposes said zero-voltage condition on said switch, when said switch is disposed to its on state.

40. A quasi-resonant converter comprising:
(a) a power source;
(b) a load;
(c) a low pass filter formed from at least an inductor and a capacitor for filtering a signal applied to said load; and
(d) a resonant switch means including:
  (1) a switch for connecting said power source to said load and for disconnecting said power source from said load, said switch operative in an on state and in an off state, and
  (2) a resonant capacitor and a resonant inductor coupled together to form a resonant circuit for imposing a voltage waveform across said switch, said resonant circuit coupled to said switch, and said resonant capacitor and said resonant inductor having respective impedances selected to shape said voltage waveform such that a zero-voltage condition is imposed upon said switch when said switch is disposed to its on state, said voltage waveform including a DC component and an AC component, wherein said AC component is greater than said DC component such that said voltage waveform imposes said zero-voltage condition upon said switch, when said switch is disposed to its on state.

41. A quasi-resonant converter comprising:
(a) a power source;
(b) a load;
(c) a low pass filter formed from at least an inductor and a capacitor for filtering a signal applied to said load; and
(d) a resonant switch means including: a switch for connecting said power source to said load, said resonant capacitor being coupled in series with said power source to form a series circuit, said series circuit being coupled in parallel with said switch to form a parallel circuit, said parallel circuit being connected in series with said resonant inductor, coupled together to form a resonant circuit for imposing a voltage waveform across said switch and said resonant capacitor and said resonant inductor having respective impedances selected to shape said voltage waveform such that a zero-voltage condition is imposed upon said switch when said switch is disposed to its on state.

* * * * *